US010464750B2

(12) United States Patent
Pruskauer (10) Patent No.: US 10,464,750 B2
(45) Date of Patent: Nov. 5, 2019

(54) RACK AND HOIST SYSTEM (71) Applicant: Mark Alan Pruskauer, Fort Myers, FL (US)

(72) Inventor: Mark Alan Pruskauer, Fort Myers, FL (US)

( * ) Notice: Subject to any disclaimer, the term of this patent is extended or adjusted under 35 U.S.C. 154(b) by 0 days.

(21) Appl. No.: 16/195,200

(22) Filed: Nov. 19, 2018

(65) Prior Publication Data

US 2019/0152700 A1 May 23, 2019

Related U.S. Application Data (60) Provisional application No. 62/587,697, filed on Nov. 17, 2017.

(51) Int. Cl.
*E04G 21/16* (2006.01)
*B65G 1/04* (2006.01)
*B66C 1/10* (2006.01)

(52) U.S. Cl.
CPC ........... *B65G 1/0442* (2013.01); *E04G 21/16* (2013.01); *B66C 1/105* (2013.01)

(58) Field of Classification Search
CPC .. B62B 1/186; B62B 1/22; B62B 1/24; B62B 1/262; B62B 1/268; B62B 3/008; B62B 3/102; B62B 3/108; B65G 1/0442; B66C 1/105; E04G 21/16; E21B 19/15
USPC .... 294/67.1, 67.22, 67.4, 67.41; 414/10, 11, 414/608, 639, 651, 773, 778, 782; 211/70.4, 164, 166; 280/79.3, 79.6, 280/47.16, 47.21
See application file for complete search history.

(56) References Cited

U.S. PATENT DOCUMENTS

| | | | | |
|---|---|---|---|---|
| 2,717,801 A | * | 9/1955 | Neil ....................... | E04G 21/16 212/234 |
| 2,820,643 A | * | 1/1958 | Cohn ..................... | B62B 1/002 280/47.2 |
| 2,972,755 A | * | 2/1961 | Abel .................... | A61G 1/0231 5/625 |
| 3,278,042 A | | 10/1966 | Frydenberg | |
| 3,400,828 A | | 9/1968 | May | |
| 3,521,924 A | * | 7/1970 | Wallenius ............... | B66C 1/105 294/67.1 |
| 3,680,715 A | * | 8/1972 | Montgomery .......... | B62B 3/108 280/47.12 |
| 3,712,493 A | | 1/1973 | Priefert | |
| 3,857,579 A | * | 12/1974 | Hoodenpyle ........... | B62B 1/002 280/47.2 |

(Continued)

*Primary Examiner* — Dean J Kramer
(74) *Attorney, Agent, or Firm* — Jason P. Webb; Pearson Butler (57) ABSTRACT

A rack and a hoist system. The rack is L-shaped with a first planar floor/leg and a second planar floor/foot, which is a solid plate. The first floor has three pairs of wheels with the middle pair larger than the other pairs and a mount to couple to the hoist via a hooked line that couples to a double-hooked line that hooks into apertures through paired mounting plates near the top end of the leg. The foot includes a tag-line mount from which a tag-line may be mounted to help guide movement thereof using the hoist. The foot includes wheels such that when the first floor is tipped up while being lifted, the wheels of the foot engage with the surface while the wheels on the leg are disengaging. There are flanking posts, strap structures, and flanking plates that help to secure the load (e.g. rebars, pipes, and sheet rock).

18 Claims, 8 Drawing Sheets

(56) References Cited

U.S. PATENT DOCUMENTS

| | | | | |
|---|---|---|---|---|
| 3,896,954 A | * | 7/1975 | Dawson | B60P 3/002 |
| | | | | 37/461 |
| 4,462,733 A | | 7/1984 | Langowski et al. | |
| 5,190,337 A | | 3/1993 | McDaniel | |
| 5,378,106 A | | 1/1995 | Risley et al. | |
| 5,556,118 A | * | 9/1996 | Kern | B62B 3/008 |
| | | | | 280/47.16 |
| 6,202,863 B1 | | 3/2001 | Grenier | |
| 6,695,325 B2 | * | 2/2004 | Carrillo | B62B 3/008 |
| | | | | 280/47.16 |
| 6,793,223 B2 | * | 9/2004 | Ondrasik | B60B 33/0002 |
| | | | | 280/33.997 |
| 6,860,493 B2 | * | 3/2005 | Orozco | B60B 33/0002 |
| | | | | 280/33.991 |
| 8,915,504 B1 | * | 12/2014 | Seibert | B62B 1/10 |
| | | | | 280/47.16 |
| 2001/0045718 A1 | * | 11/2001 | Boirum | B25H 3/02 |
| | | | | 280/47.26 |
| 2003/0170095 A1 | | 9/2003 | Slettedal | |
| 2006/0091096 A1 | | 5/2006 | Velez et al. | |
| 2014/0027395 A1 | | 1/2014 | Benoit et al. | |

\* cited by examiner

RACK AND HOIST SYSTEM

CROSS-REFERENCE TO RELATED APPLICATIONS

This invention claims priority, under 35 U.S.C. § 120, to the U.S. Provisional Patent Application No. 62/587,697 to Mark Alan Pruskauer filed on Nov. 17, 2017, which is incorporated by reference herein in its entirety.

BACKGROUND OF THE INVENTION

Field of the Invention

The present invention relates to hoists and racks, specifically a rack for use with objects having a high aspect ratio.

Description of the Related Art

When constructing multi-level buildings, it is necessary to lift materials and equipment up to the various levels thereof in order to execute such construction. Accordingly, various tools and equipment have been developed to permit and/or facilitate workers in lifting such.

Scaffolding is sometimes used to allow workers to carry equipment and materials up to higher levels of a building under construction and to allow them to work, especially on building exteriors. Sometimes rope/chain and pulley systems are used therewith to allow workers to lift smaller objects up to various levels of scaffolding and/or directly to floors where the same is needed.

Cranes are often used for larger projects, with the size of the crane generally reflecting the size of the project. Cranes allow for rather heavy materials to be lifted very high and to even be transported through the air horizontally. Cranes exist in an enormous variety of forms—each tailored to a specific use. Sizes range from the smallest jib cranes, used inside workshops, to the tallest tower cranes, used for constructing high buildings. Mini-cranes are also used for constructing high buildings, in order to facilitate constructions by reaching tight spaces. There are larger floating cranes, generally used to build oil rigs and salvage sunken ships. Some lifting machines do not strictly fit the above definition of a crane, but are generally known as cranes, such as stacker cranes and loader cranes.

A winch is a mechanical device that is used to pull in (wind up) or let out (wind out) or otherwise adjust the "tension" of a rope or wire rope (also called "cable" or "wire cable"). In its simplest form it consists of a spool and attached hand crank. In larger forms, winches stand at the heart of machines as diverse as tow trucks, steam shovels and elevators. The spool can also be called the winch drum. More elaborate designs have gear assemblies and can be powered by electric, hydraulic, pneumatic or internal combustion drives. Some may include a solenoid brake and/or a mechanical brake or ratchet and pawl device that prevents it from unwinding unless the pawl is retracted.

Lifts and hoists are also used, with the simplest version being an actual functioning elevator that can be used in the final stages of building to bring equipment and materials to higher levels for finishing work on building floors. A hoist is a device used for lifting or lowering a load by means of a drum or lift-wheel around which rope or chain wraps. It may be manually operated, electrically or pneumatically driven and may use chain, fiber or wire rope as its lifting medium. The most familiar form is an elevator, the car of which is raised and lowered by a hoist mechanism. Most hoists couple to their loads using a lifting hook.

Some improvements have been made in the field. Examples of references related to the present invention are described below in their own words, and the supporting teachings of each reference are incorporated by reference herein:

U.S. Pat. No. 3,400,828 issued to May, discloses a holder and transporter for slender articles of great length including two identical units, each of which has parallel integrally connected arm members serving as both hand holds and pipe-gripping means. The pipes are supported between the holders with two pipes being gripped thereby to form a portion of the transporter itself.

U.S. Pat. No. 4,462,733, issued to Faustyn et al., discloses a pipe racking system is shown of the type having a vertical track, a lifting assembly adapted for vertical movement along the track, a horizontal beam for supporting the vertical track, and a movable carriage connecting the vertical track to the horizontal beam. The lifting assembly is supported by a wire rope running from the lifting assembly inside the vertical track and outside the carriage to a source of lifting power. A fixed guide sheave mounted in the carriage serves as a first point of contact for the wire rope running from the lifting head to the carriage. A rotatable guide sheave mounted in the carriage serves as a second point of contact for the wire rope. The rotatable guide sheave is rotatable by the wire rope in response to movement of the carriage, vertical track, and horizontal beam to center the wire rope in the guide wheel grooves of the guide sheaves during racking operations.

U.S. Pat. No. 6,202,863, issued to Grenier, discloses sucker rod cradle for storage, handling and transportation of sucker rods comprises in combination a base frame having forklift pockets, a plurality of upright cradle arms spaced along the base frame and extending perpendicular to the base frame. The cradle arms having channels to receive ends of spacers for stacks of sucker rods. The cradle arms may also receive ends of bundle spacers to permit transport of bundles of multiple rods. The base frame may be made up of spaced apart beams interconnected by cross members. The ends of the base frame may also include U-shaped bars to provide for crane lifting of the sucker rod cradle. The base frame may also include drip pans to contain contaminants dripping from the bundles of sucker rods. The cradle apparatus provides a very convenient system for storage, transport and on sight handling of sucker rods used in oil field facilities.

U.S. Pat. No. 5,378,106, issued to Risley et al., discloses a compressed gas cylinder carrier for retaining and transporting a plurality of such cylinders. The carrier includes a cage or framework having a base and top interconnected by a plurality of vertical bars. The base includes slide rails on which is slideably mounted a sled that can move between opposite ends of the carrier within the framework thereof. The sled has a base and a sidewall portion integral therewith and extending upward there from. The sled base and sidewall form a cylinder retaining space. One carrier end has a hinged door for providing access to the interior of the carrier. A strap extends around the sled and is engaged through an adjustable buckle secured to the door. The top end of the carrier has a roof structure for forming a forklift receiving cavity. In operation, the present invention is sized to retain a plurality of compressed gas cylinders. The cylinders are placed and held within the interior of the framework wherein one cylinder rides on the sled being retained on the base thereof and the remaining cylinders rest on the slides of the framework base. Access to the frame interior is through the end door. When fully loaded, the sled is positioned at the end of the carrier opposite from the access door. The door can then be secured closed and the strap pulled through the buckle wherein the carrier is urged and held against the other cylinders, thereby pressing such cylinders against the secured access door. In this manner any space between the cylinders is taken up so that they are securely held together within the carrier framework.

U.S. Pat. No. 5,190,337, issued to McDaniel, discloses a pickup truck rack includes upper rails of "H" shape cross section, a lower channel of which receives folding legs and braces within in a collapsed condition. An upper channel telescopically receives an over cab rack extension. In an alternative embodiment, the rack extension moves to a vertically stored position.

U.S. Pat. No. 3,278,042, issued to Frydenberg, discloses a receiver for receiving pieces of lumber or the like comprising a frame, spaced pairs of upstanding posts on said frame, the posts of each said pair being spaced apart from each other, a soft flexible web extending between the upper ends of the posts of each said pair and draped therebetween to receive said pieces, and means including clamp elements for clamping the ends of each of said webs against the tops of respective ones of said posts; portions of said webs adjacent said ends being wrapped over the tops of said respective claim elements whereby to protect said pieces from engaging said clamp elements.

The inventions heretofore known suffer from a number of disadvantages, including but not limited to having poor maneuverability of long materials such as pipe and rebar shafts, not being stable, not being safe, being difficult to use, being difficult to operate, being inefficient, failing to properly distribute the materials, distorts materials being transported, allows for outside interference, fails to increase productivity, is not reliable, requires too many additional safety devices and processes, are not customized for lifting elongated objects, requires a great deal of space to execute a transport, too expensive, cannot be run continuously, are too loud, fail to operate smoothly, are not always available, have a high cost of ownership, causing damage or being likely to cause damage to materials, requiring a great amount of labor to operate, not being safe for operators, and being slow in the delivery of the materials and/or equipment that is transported.

What is needed is a rack and/or hoist and/or lift device, system, and/or method that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available racks. Accordingly, the present invention has been developed to provide a rack and/or hoist system for hoisting objects having a high aspect ratio.

According to one embodiment of the invention, there is a construction rack. The construction rack includes a first floor and/or a second floor. The first floor, which may be planar and/or long in relation to its width, may include: first end region that may have first mount structure, a second end region, that may be opposite the first end region, a middle region that may be between the first end region and the second end region, and/or a first side of the first floor from which a first plurality of wheels may extend. It may be that the first plurality of wheels includes a first pair of wheels that may extend from the first end, a second pair of wheels that may extend from the second end, and/or a third pair of wheels that may extend from the middle portion. It may be that the second floor is a solid second floor that may extending orthogonally from the second end region of the first floor and may be opposite the first side of the first floor. The second floor may include a second mount structure that may extend opposite the second end region; and/or a second plurality of wheels that may extend therefrom opposite the second end region of the first floor and/or may be positioned and sized such that when the first floor is tipped, while the first plurality of wheels is engaged with a surface, from horizontal to vertical with the solid second floor being on the bottom, the second plurality of wheels engage with the surface as the first set of wheels disengage with the surface.

The construction rack may also include a pair of flanking protrusions that may extend from the first end region of the first floor, and/or may be opposite the first side and/or opposite each other. There may also be a pair of flanking plates that may be coupled to each of and/or disposed orthogonal to each of the first floor and the second floor at an intersection of the first floor and the second floor and/or may be disposed opposite each other.

It may be that the first mount structure is a pair of aperture plates disposed opposite each other. It may be that the second mount structure is a bar mounted to the second floor opposite the second end region of the first floor. It may be that the third pair of wheels are larger in diameter than each of the first pair of wheels and the second pair of wheels. It may be that there is a first strap structure disposed between the first end region and the middle region and a second strap structure disposed between the middle region and the second end region. It may be that there is a plurality of ring mounts disposed along lateral sides of the first floor. It may be that there is an elongated flexible member coupled to the first mount structure.

In another non-limiting embodiment, there is a hoist system. The hoist system may include a rack, such as one or more embodiments of racks described herein, a first elongated flexible member, a hoist, and a third elongated flexible member. The first elongated flexible member may be coupled to the first mount structure of the rack. The hoist may be coupled to the elongated flexible member by a second elongated flexible member. The third elongated flexible member may be coupled to the second mount structure. There may be a pair of flanking protrusions extending from the first end region of the first floor, opposite the first side and opposite each other. There may be a pair of flanking plates that may be coupled to each of and/or disposed orthogonal to each of the first floor and the second floor at an intersection of the first floor and the second floor and/or may be disposed opposite each other.

It may be that first mount structure is a pair of aperture plates disposed opposite each other. It may be that the second mount structure is a bar mounted to the second floor opposite the second end region of the first floor. It may be that the third pair of wheels are larger in diameter than each of the first pair of wheels and the second pair of wheels. It may be that the hoist includes a building mount that couples the hoist to a floor or roof of a building. It may be that there is an extendible floor coupled to a floor of the building below the hoist and positioned such that when the extendible floor is extended the hoist may directly deposit the rack onto the extendible floor.

In still another embodiment, there may be a rack for containing and transporting elongated objects. The rack may include an L-shaped floor that may have a planar leg coupled to a planar foot. The planar leg may have a first plurality of wheels that may extend from a backside thereof and/or a pair of mounting plates that may be disposed on opposite sides thereof. The planar foot may be smaller than the planar leg. The planar foot may be a solid plate. The planar foot may include a second plurality of wheels that may extend from a bottom thereof and/or a tag-line mount that may extend from a bottom thereof. It may be that the mounting plates include an array of apertures. It may be that there are a pair of flanking posts extending forwardly from a top region of the leg and/or a pair of flanking plates disposed at a bottom region of the leg and/or extending from each of the leg and the foot.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

Figure 1:
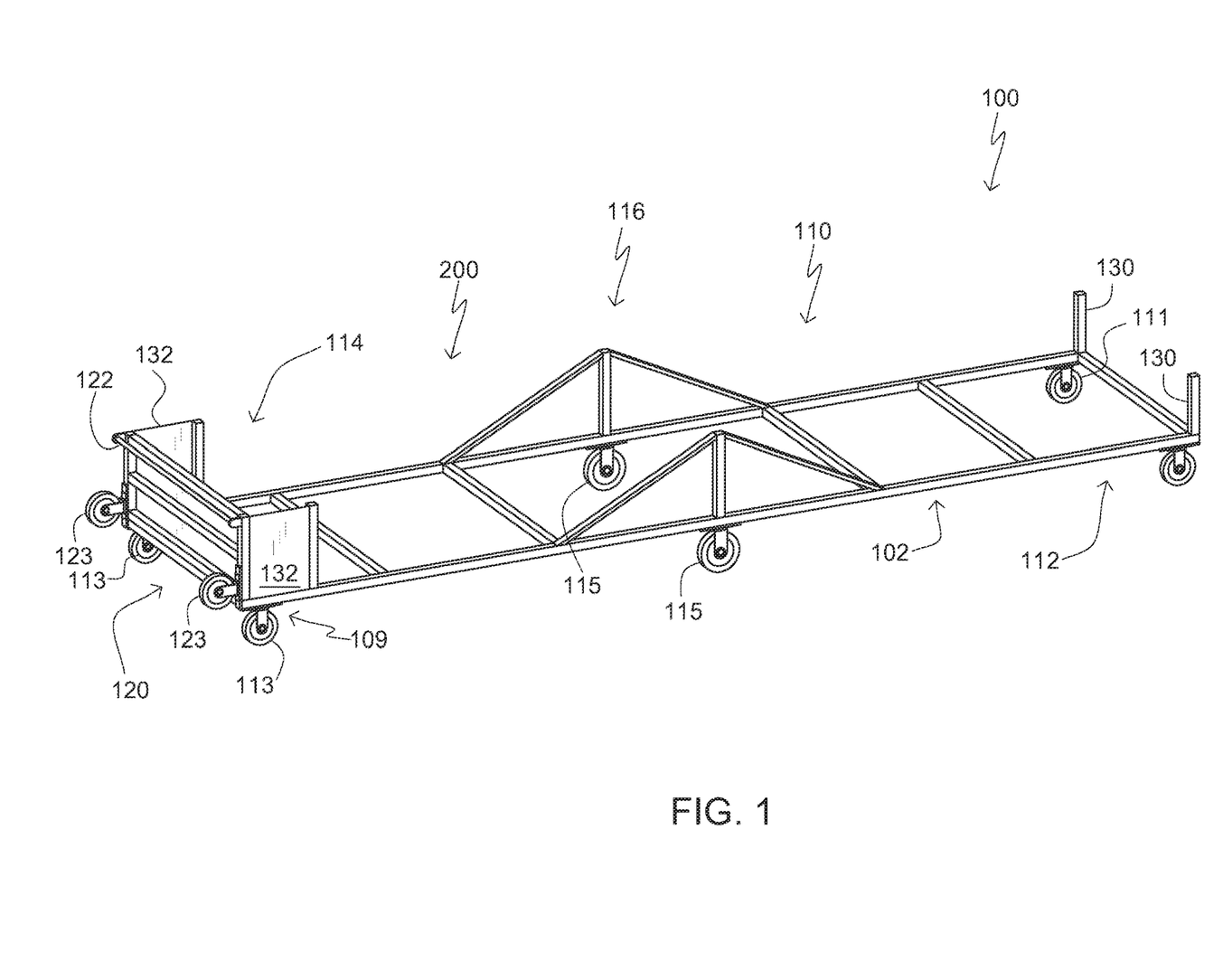
FIG. 1 is a perspective side view of a rack of a hoist system, according to one embodiment of the invention.

FIG. 1 illustrates an L-shaped rack with a longer leg coupled to a shorter foot that may be used for construction (e.g. a construction rack) and in particular may be used for transporting objects having a high aspect ratio (e.g. rebar, pipes, drywall sheets, glass). As used herein, directions associated with the leg and the foot (e.g. front, back, bottom top) are used in the usual sense that one would refer to their own personal leg/foot, without respect to whether the rack is in a horizontal or vertical position.

The illustrated rack is particularly useful in that it allows for easy horizontal loading of such articles on a surface (e.g. the ground or a floor of a building under construction) but then allows for those same articles to be transported vertically by a hoist, crane, or other similar device. Vertical transport of articles of high aspect ratio is safer, more convenient, easier, and requires fewer people than the widely used horizontal transport of such articles. The illustrated construction rack 100, includes a first floor 110 coupled to a second floor 120 with wheels extending from each of the first and second floors. Advantageously, the rack may transition between vertical and horizontal positions with the wheels as bottom support during and after such transitions.

The illustrated first floor (leg) 110 is planar and long in relation to its width. It includes a first end region (top) 112 having a second end region (bottom) 114, opposite the first end region 112. There is also a middle region 116 between the first end region 112 and the second end region 114. Further, there is a first side (backside) 102 of the first floor 110 from which a first plurality of wheels extends. The first plurality of wheels including a first pair of wheels 111 that extend from the first end region 112, a second pair of wheels 113 that extend from the second end region 114 and a third pair of wheels 115 that extend from the middle region 116. The illustrated third pair of wheels 115 are larger in diameter than each of the first pair of wheels 111 and the second pair of wheels 113. This larger diameter middle set of wheels allows one to balance the rack on just the middle wheels and then use that pair of wheels to easily pivot the rack about the two wheels and thereby produces a very tight and easy turning circle for repositioning the rack, especially when loaded. This is particularly advantageous when king in tight spaces, working around other machinery, or when one must load or unload a rack at a particular orientation, but a different orientation is needed for safe raising/lowering/travel of the rack.

The illustrated second floor (foot) 120 is a solid surface (a plate, as compared to the illustrated lattice-work first floor) that is smaller than the illustrated first floor. This solid surface prevents elongated objects that are loaded thereon from slipping through the second floor during vertical transport. Accordingly, the second floor need not be perfectly solid, as a tight mesh or grid of material may be sufficient so long as any holes/apertures therethrough are small enough to prevent the loaded materials from escaping out the bottom of the second floor. As such, one may generally select a grid-spacing (if not completely solid) that is smaller than the smallest load anticipated.

The second floor extends orthogonally from the second end region 114 of the first floor 110 opposite the first side 102 of the first floor 110, thereby forming an L-shape of the first and second floors combined. The exactness of the orthogonal relationship needs to be sufficiently orthogonal such that the load is firmly supported by the second floor and there is not a substantial risk of the load slipping off the second floor. Further, the coupling between the first and second floors should be sufficiently strong to support anticipated loads.

The second floor also includes a second mount structure (tag-line mount) 122 extending opposite the second end region 114. The illustrated the second mount structure 122 is a bar mounted to the second floor 120 opposite the second end region 114 of the first floor 110. The tag-line mount allows for users to mount a tag-line to the bottom of the second floor, which may be used to help guide and control the position/orientation of the rack while it is suspended by a hoist or crane. In practice, a worker may hold the tag-line as the rack is being moved and may apply force through the tag-line during such in order to influence the movement thereof, to reduce swinging, to provide fine positioning that may be difficult to provide through the hoist/crane, etc.

There is also shown a second plurality of wheels 123 extending therefrom opposite the second end region 114 of the first floor 110 (i.e. the bottom of the foot). The second plurality of wheels is positioned and sized such that when the first floor 110 is tipped (e.g. while being lifted by a hoist or crane at the opposite end), while the first plurality of wheels (111, 113, 115, collectively) are engaged with a surface 200 (See FIG. 12), from horizontal to vertical with the solid second floor 120 being on the bottom, the second plurality of wheels engage with the surface as the first set of wheels disengage with the surface. Generally, the wheels will be mounted near the intersection of the first and second floors and will each be of a diameter sufficiently large such that one may draw a straight line tangential to the wheels of the second floor and also tangential to the bottom wheels of the first floor 113 and that straight line will not intersect with either of the first or second floor. Accordingly, a surface (e.g. the ground) could also be tangential to each set of wheels and not touch the floors of the rack.

Also shown are a pair of flanking protrusions (flanking posts) 130 extending from the first end region 112 of the first floor 110, opposite the first side 102 and opposite each other (i.e. extending forwardly from a top of the leg). These posts may serve to cradle/contain loaded articles, especially when the rack is in the horizontal position.

Also shown are a pair of flanking plates 132 coupled to each of and disposed orthogonal to each of the first floor 110 and the second floor 120 at an intersection 109 of the first floor 110 and the second floor 120 (i.e. disposed at the bottom of the leg at the ankle) and disposed opposite each other. These flanking plates help to prevent articles from sliding out of the bottom of the rack when it is in a vertical orientation and also provide strength to the intersection of the floors. The flanking plates are illustrated as solid, but may be mesh or grid-like in a manner similar to the second floor.

Also shown are a pair of containment wings above the middle wheels of the first floor which may cradle and otherwise provide support for materials to be deposited therein, such as but not limited to pipe, rebar, and drywall.

In one non-limiting embodiment, there is a lift system that includes a rack (cradle), a winch having a line and coupling device at an end thereof that selectably and removably couples to a front/top end of the cradle, a tag line that couples to a back/bottom end of the cradle, and a set of securing devices selectably coupleable about the cradle such that they secure materials deposited therein.

In one non-limiting embodiment, there is a cradle that allows you to vertically lift pipe, rebar, and drywall, without worrying about material falling through. The cradle is long and it may be made out of pipe or other elongated rigid materials. The cradle is narrow. The cradle is loaded laying longways with the materials (e.g. rebar, pipe, drywall) laying within the cradle and being secured thereto. The cradle is then lifted by one end until it stands vertically and then is lifted straight up with the long axis oriented straight upwards. It is shaped similar to a dolly that can securely hold the load while it is being lifted by a crane, winch, hoist, etc.

The cradle includes a horizontal floor (first floor) that functions as the floor for the lifted material when it is being loaded. The cradle includes a vertical floor (second floor) coupled to the first floor and adjacent thereto, wherein the vertical floor functions as a floor for the lifted material when it is being lifted. There are wheels on each of the first and second floor so that the cradle can be rolled while it is in either orientation (laying down or upright). There are mount points along the horizontal floor wherein securing members (e.g. straps, ropes, chains, bungees) couple to the mount points to secure the materials within the cradle. There are wheels disposed underneath each of the first and second floors, with larger pivoting wheels in the middle large enough in diameter compared to the other wheels that you can balance the load on the large pivoting wheels and not have the other wheels touch. There are lift mount points disposed on the first floor near an end opposite the second floor to which a lift cable may be coupled to the lift mount points to which the crane/winch/hoist couples. There are also containment wings/protrusions disposed about sides of the first floor (top, bottom, and middle that may be shaped as a triangle to form walls within which to confine the lifted materials and to further support and cooperate with the securing members. There is a bottom mount point that may be a bar on the bottom of the second floor that allows for and/or includes a tag line and also allows for a hook to be used to grab the bottom and pull it towards the building if you need to position the cradle when the bottom of the cradle has reached the intended floor.

In operation of one non-limiting embodiment of the invention, the cradle rests longways on the ground near a building under construction. Workers load the cradle with elongated materials, such as but not limited to rebar, pipe, drywall, and the like and combinations thereof. The materials are placed on the cradle such that an end thereof rests near or against the second floor (vertical floor) so as to limit shifting of materials during a transition from the cradle laying down to being upright.

Securing members of an appropriate strength to meet legal and safety requirements are coupled to mount points on the cradle and thereby secure the materials to the cradle in a safe and effective configuration. A cable is coupled to an end of the cradle opposite the second floor, such as but not limited to with a clip, hook, and or carabiner-style connector hooking about a mount thereon. The cable is in communication with a winch, crane, pulley, or other lifting device/mechanism that is able to pull the cable upwards along the side of the building. The cable is lifted, and thus a front-end of the cradle is lifted. As the front-end of the cradle is lifted, wheels under the cradle roll the back-end of the cradle towards a region underneath the rising front-end of the cradle until the back-end of the cradle is substantially underneath the front-end thereof. It may then be said that the front-end is effectively the top-end and the back-end is effectively the bottom end, with the second floor (vertical floor) now being the floor on which the materials rest.

The cable is further lifted and there by the cradle with its materials are also lifted in an upright orientation until the bottom-end of the cradle is proximate a floor of the building (or roof) where it is desired to transport the materials. During this lifting, a worker may hold to a tag line that is coupled to the bottom-end of the cradle, thereby having control/influence over any swinging or other motion thereof, thus improving the safety and security of the lifting operation. A worker at that location may hook the bottom-end of the cradle and pull the bottom-end thereof so that it is no longer directly beneath the top-end but is instead suspended over a region of the location where it is desired to deposit the materials. Alternatively, a movable floor coupled to the floor/roof may be shifted to be underneath the cradle.

Once the bottom-end of the cradle is suspended over a surface on which it may be deposited the cable may be lowered so that the wheels of the cradle contact the surface thereof. Once the wheels are in contact thereof, the cable continues to be lowered as the workers pull or otherwise make sure that the bottom-end of the cradle rolls into the space where the material is to be transported. This continual lowering of the cable, and thereby the lowering of the top-end, results in a re-orientation of the cradle from upright to laying down. Once fully laying down, the cable may be disconnected therefrom so that the worker can wheel the cradle to a location on the floor where it may be unloaded. Once unloaded, the cradle may be lowered back to the ground by reversing the process already described.

The illustrated floors (vertical and horizontal) provide structure that supports materials deposited therein. Generally, such materials are elongated and therefore the horizontal support need not be a solid surface, but just have struts or other structures against which the materials may rest and be prevented from falling therethrough. Generally the vertical surface will be solid or a mesh with a grade fine enough to prevent materials from falling therethrough (e.g. a mesh with a hole size smaller than the effective diameter of the rebar or pipe or other materials intended to be carrier thereby. The floors may be solid, mesh, chain mesh/netting, may be of a multi-layered material, and the like and combinations thereof. There may be one or more additional vertical floors, such as but not limited to a series of vertical floors that compartmentalize the cradle into carrying sections for shorter materials. Such floors may be detachable floors so that the cradle may be converted from a multi-compartment storage device to a single compartment as shown in the illustrations.

The illustrated wheels allow the cradle to roll during transition from laying down to being upright and vice-versa and also allow users to move and position the cradle. The wheels may be rubber wheels, steel wheels, swivel mounted wheels, fixed mount wheels, rollers, caster wheels, and the like and combinations thereof.

The illustrated containment wings/protrusions provide side boundaries for the materials and cooperate with the securing devices to secure the materials to the cradle during operation. The wings/protrusions may be detachable and/or movable. Instead of being wings, they may be mere protrusions. The wings/protrusions may be provide additional support for the floor, may be of various shapes and various sizes, may be symmetrical/asymmetrical with respect to each other. They may be solid walls, netting, mesh, framework or the like or combinations thereof.

Advantageously, construction workers may be better able to lift elongated materials to higher floors of a building under construction. Current methods are slow, expensive, and dangerous as they generally bundle the materials together and secure them at a mid-point then lift them and transport them while they hang horizontally, balancing precariously at that middle point. The materials sometimes turn in an undesired manner and strike other objects and/or people during movement and if the balance is lost or the securing is not done well, the entire load can fall, causing damage and harm below. With the presently described system and cradle, the materials are much better secured, more easily moved with fewer workers required to operate the process. Further the described system is much less expensive than typical crane setups and much quicker to install.

Figure 2:
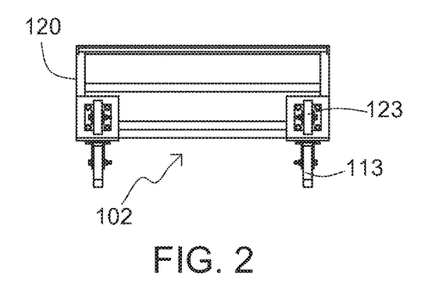
FIGS. 2-4 illustrate side, back, and front views, respectively, of a rack of a hoist system, according to one embodiment of the invention.
Figure 3:
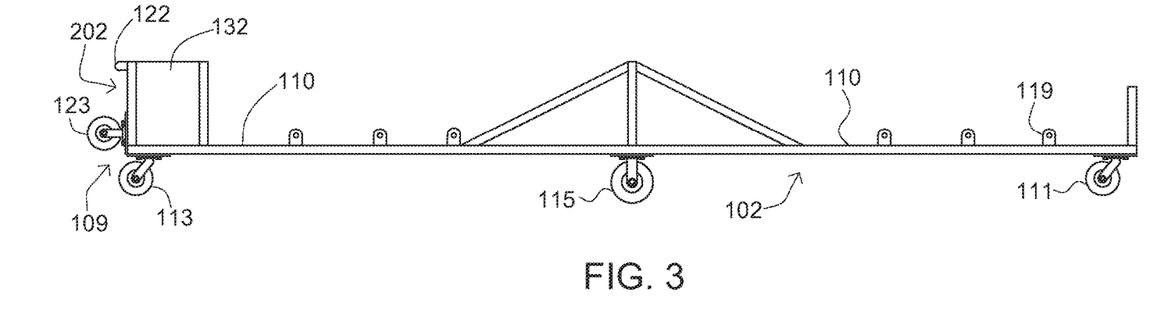
Figure 4:
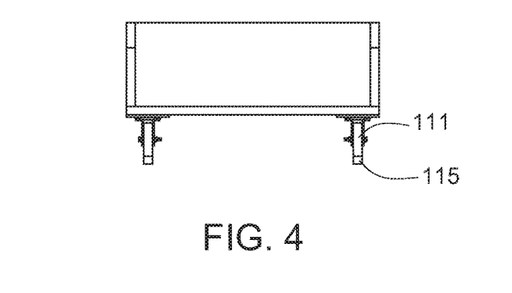
Figure 5:
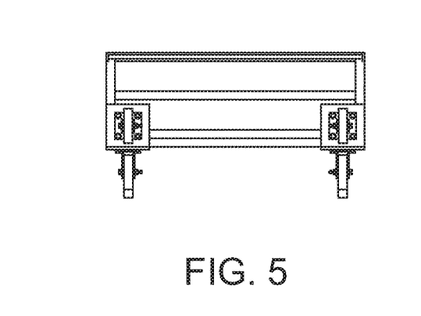
FIG. 5-7 illustrate side, back, and front views, respectively, of a rack of a hoist system, according to one embodiment of the invention, wherein the cradle is shorter and has fewer mount points than that illustrated in FIGS. 2-4.
Figure 6:
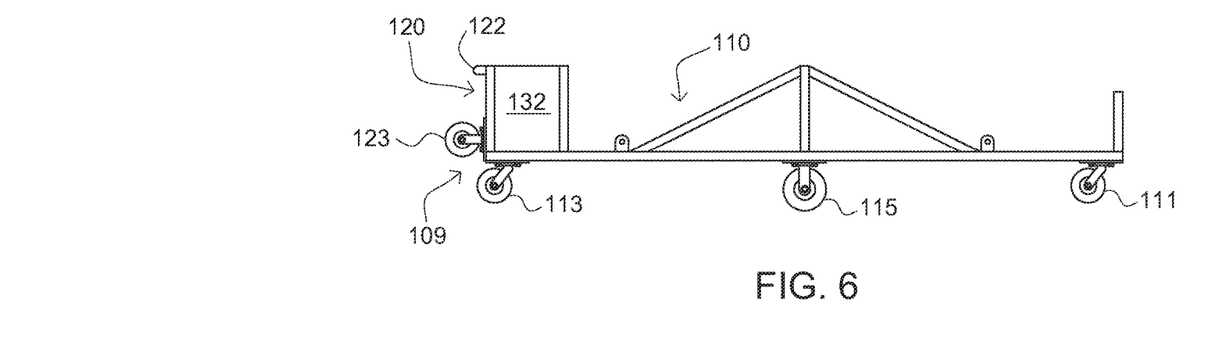
Figure 7:
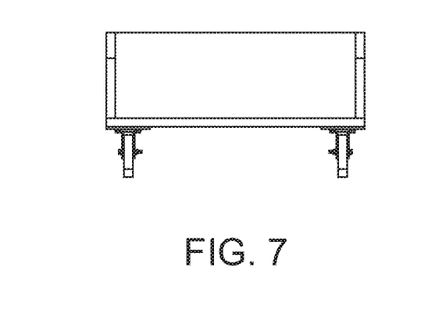

The following are further non-limiting benefits/structures of one or more embodiments of the invention and one or more of the same may apply to such various embodiments, though not all are required to apply to any particular embodiment:
- Increases Safety, Efficiency, and Provides General Convenience
- Provides Necessary and Natural Distribution of the Material
- Stiffeners and Specific Engineered Design Prevents Distortion of the Material
- Safety Enclosure that surrounds Rack prevents outside interference with its normal operation and to safe guard personnel.
- Ability to increase productivity, increase lifting space utilization, and decrease lifting/movement costs
- Assurance of long-term performance and reliability
- Designed to Fit Specific Application, Location, and Lifting Needs
- Minimal Room Required for Material Movement
- Lower Cost and Time Alternative to Personnel Elevators and Tower Cranes
- Designed to Run Continuously with No Down Time
- Quiet & Smooth Operation
- Available When You Need It
- Low Cost of Ownership (i.e. Maintenance, Service Contracts, Inspections, etc.)
- Heavy Duty fabrication to handle 10,000 pound (5 ton) load capacity
- Welded and Bolted Construction for Durability
- Sturdy Design holds up in difficult operating environments
- Vertical Lifting Long Loads in tight spaces
- Handles a wide range of load lengths
- Hinged side rails to accommodate Quick and Easy Bulk Loading and Unloading
- Safely and Efficiently lifts, moves, and positions a load
- Variable lifting points, Good for unbalanced loads
- Adds stability where headroom is not limited
- Strategically positioned wheels to make ground and floor movement easy
- the wheels allow the load to be brought inside the building in its entirety, allowing workers to bring the load in safely, rather than the safety risks of being tethered off and making trips outside the edge of the building
- Easy Attachment—No tools required
- Designed and manufactured to ASME standards FIGS. 2-4 illustrate side, back, and front views, respectively, of a rack of a hoist system, according to one embodiment of the invention; and FIG. 5-7 illustrate side, back, and front views, respectively, of a rack of a hoist system, according to one embodiment of the invention, wherein the cradle is shorter and has fewer mount points than that illustrated in FIGS. 2-4. There is shown a rack having a first floor 110 coupled to a second floor 120 at an intersection 109 with wheels 111, 113, and 115 extending from a backside 102 of the first floor and wheels 123 extending from a bottom 202 of the second floor. A pair of flanking plates 132 couple to each of the first and second floors at the two outside vertices thereof.

There are shown a plurality of mount structures 119 disposed on a front side of the first floor. These mount structures allow for coupling thereto. Generally, they are used to couple straps, cords, and the like to the first floor and such may be used to secure a load and/or to couple to a hoist/crane as desired. Having a plurality of mount structures allows operators to suspend the rack from varying mount points which provides different balance mechanics, which is useful in cases where varying loads have different centers of gravity and/or wherein load paths require different positioning of the load.

Figure 8:
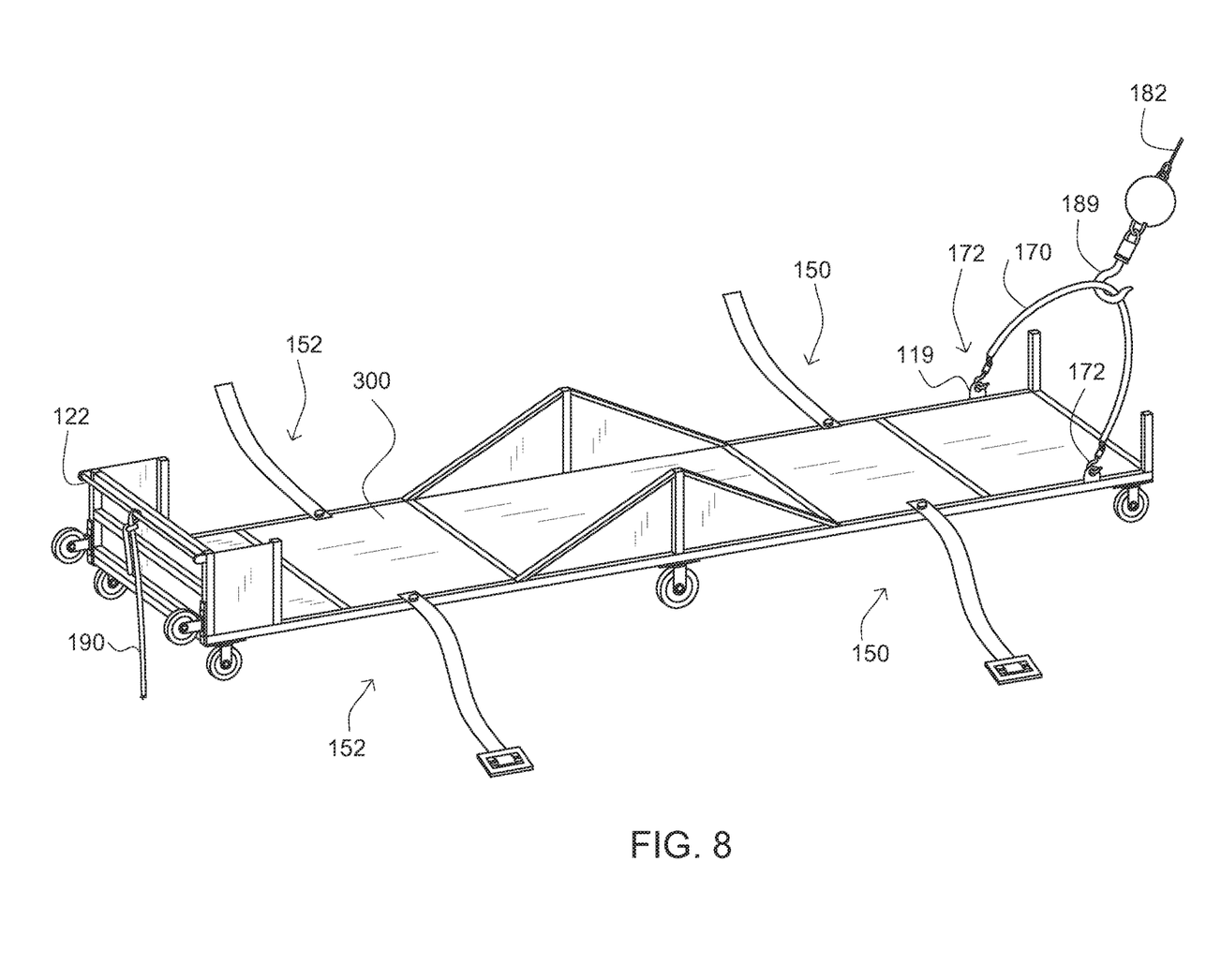
FIG. 8 is a perspective side view of a rack of a hoist system, according to one embodiment of the invention.

FIG. 8 is a perspective side view of a rack of a hoist system, according to one embodiment of the invention. There is shown a rack having a solid first floor 300

As shown the rack is coupled to a hoist/crane via an elongated flexible member 170 coupled to the first mount structure 119 by hooks 172. The elongated flexible member 170 is coupled via hoist/crane hook 189 that is coupled to a hoist/crane line 182.

The illustrated straps include a first strap structure 150 disposed between the first end region and the middle region and a second strap structure 152 disposed between the middle region and the second end region. Accordingly, a load may be secured near the top and bottom without interfering with the hoist/crane line or the tag-line 190 that is coupled to the illustrated bar 122.

Figure 9:
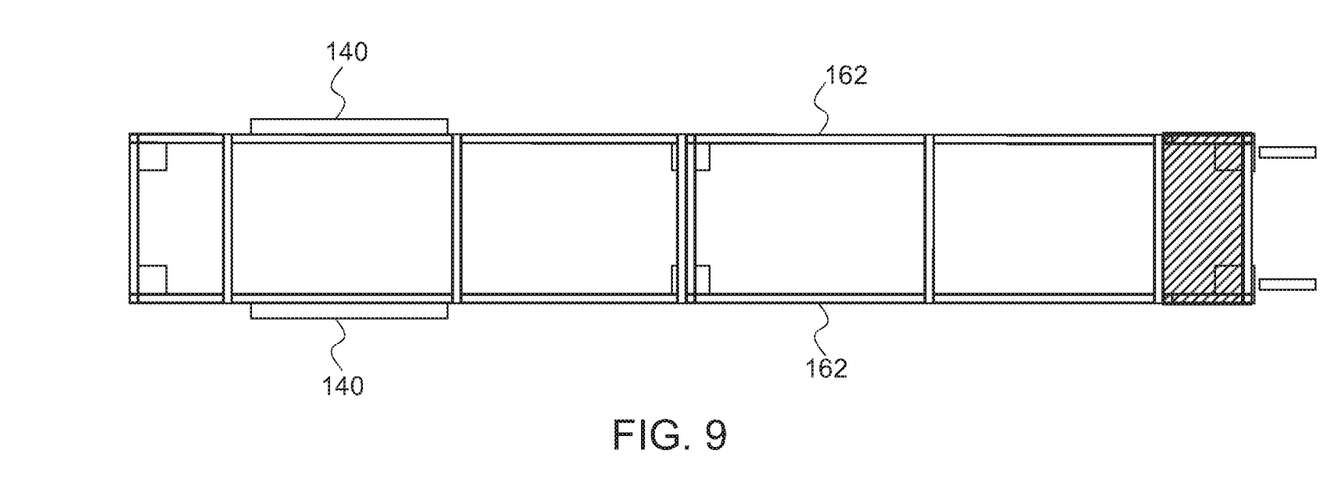
FIGS. 9 and 10 are top and side views, respectively, of a rack of a hoist system, according to one embodiment of the invention.
Figure 10:
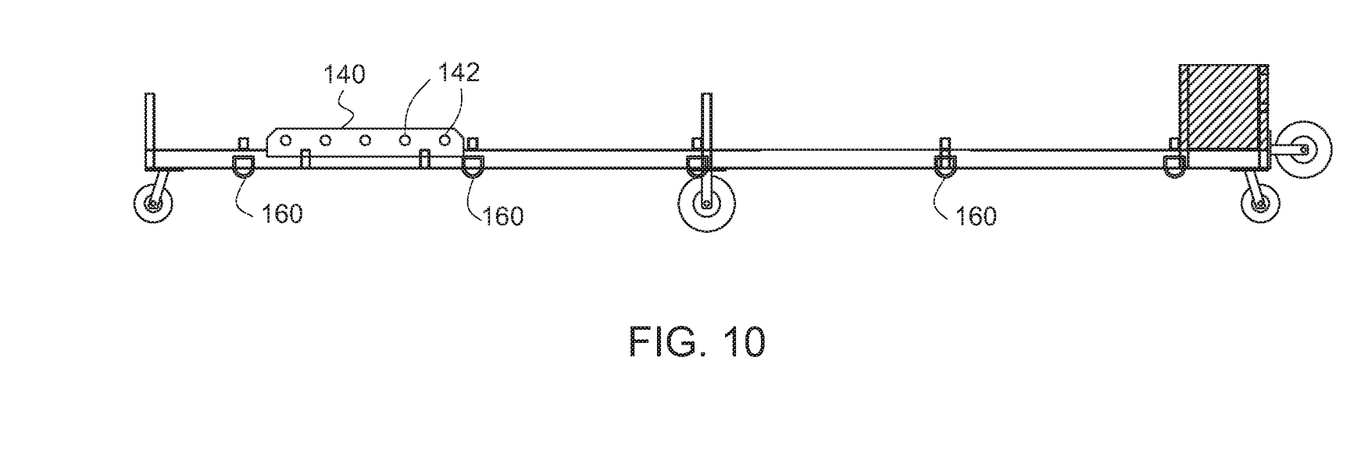

FIGS. 9 and 10 are top and side views, respectively, of a rack of a hoist system, according to one embodiment of the invention. There is shown a rack having mount plates (aperture plates) 140 and ring mounts 160 disposed along lateral sides 162 of the first floor. The aperture plates 140 include an array of apertures 142 are a first mount structure by which the hoist/crane may couple to the rack. The aperture plates provide an array of coupling locations that are spaced close together and allow for a finer control of balance and orientation than possible with wider spaced mount structures. The aperture plates also provide a stronger coupling of the mount structure to the first floor and reduce costs and increase consistency in manufacturing.

Figure 11:
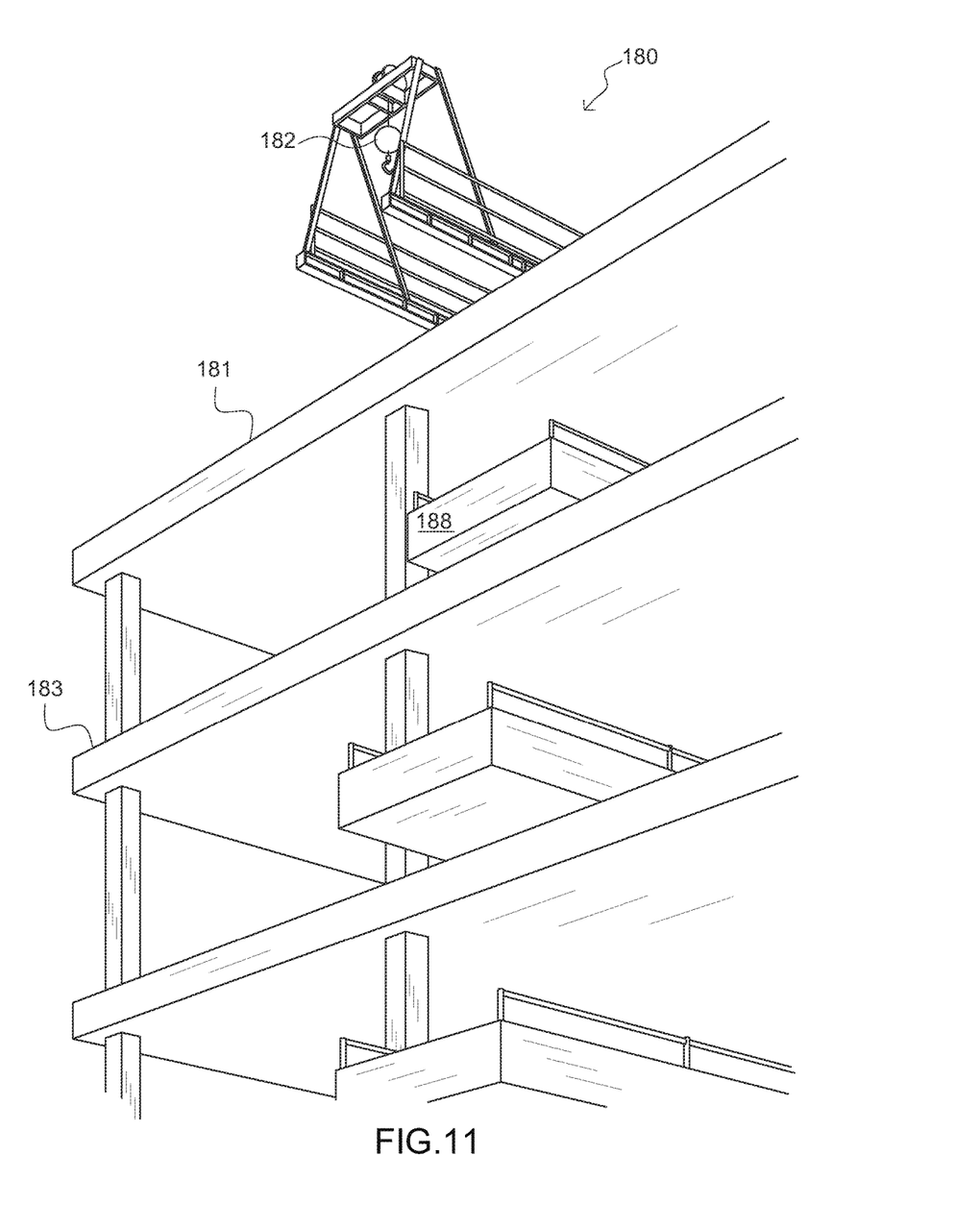
FIG. 11 is a perspective view of a hoist of a hoist system mounted to a top of a structure.
Figure 12:
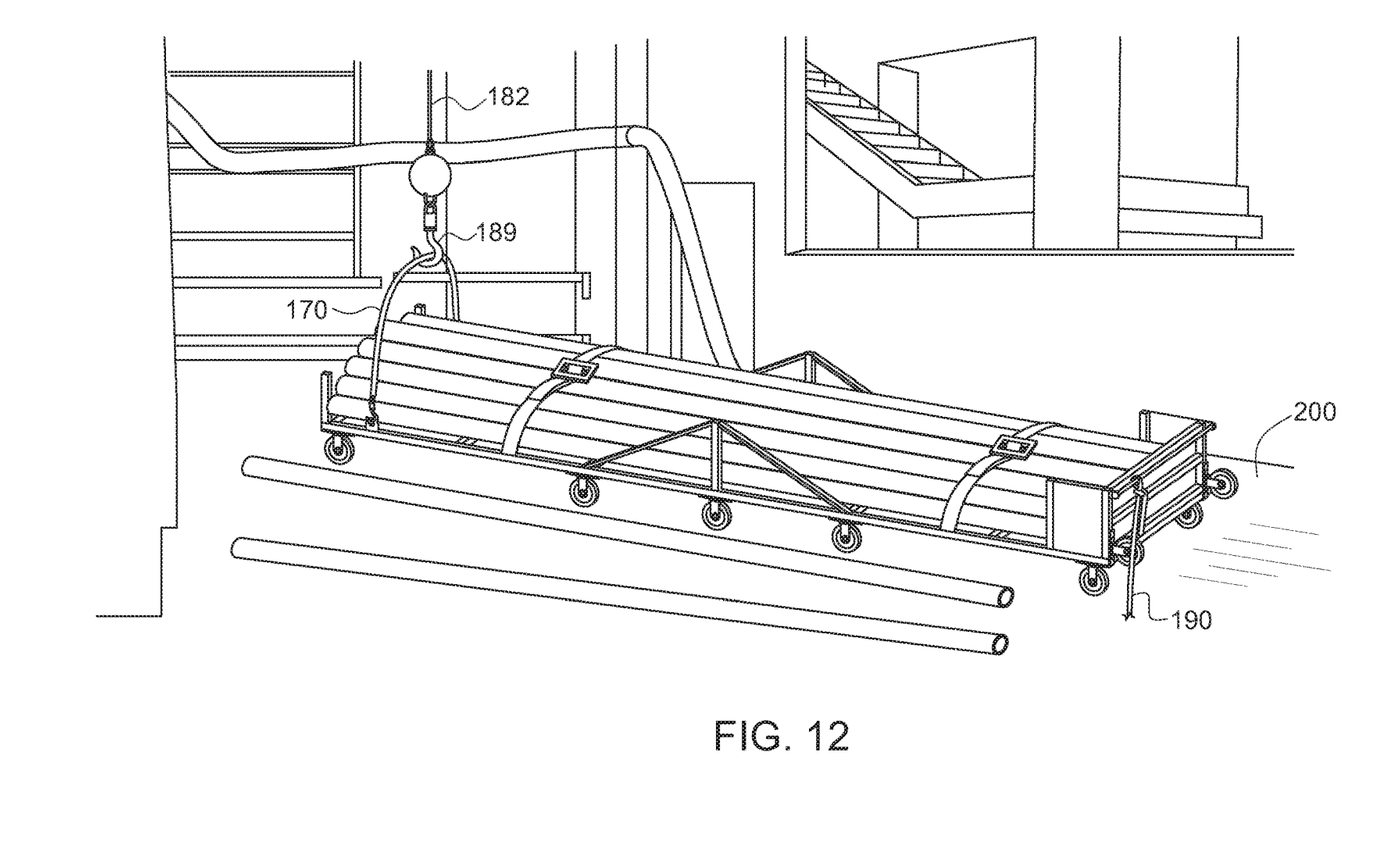
FIG. 12 is a loaded rack coupled to a hook of a hoist of a hoist system, the rack in a horizontal position on the ground, according to one embodiment of the invention.
Figure 13:
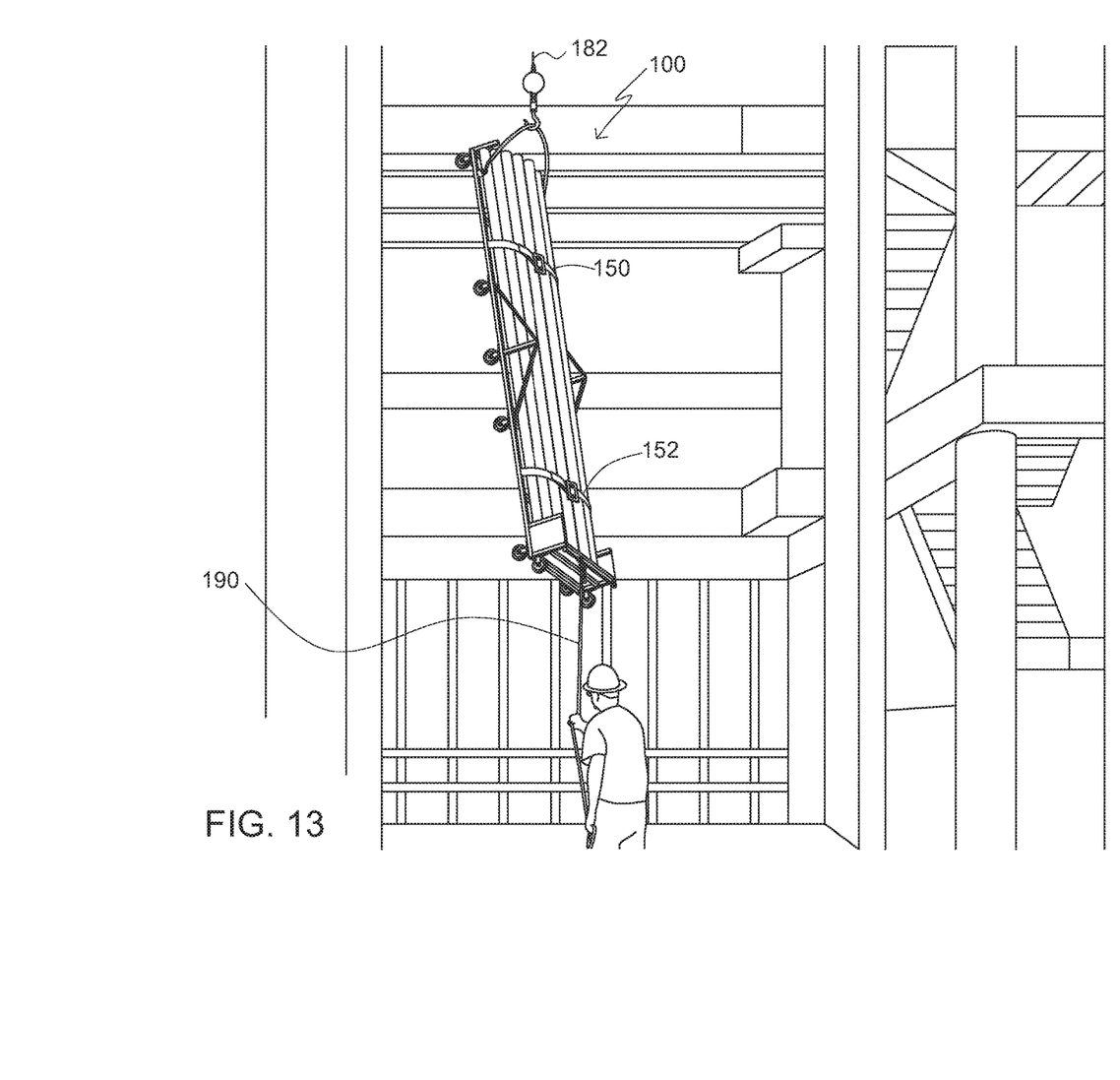
FIG. 13 is loaded rack coupled to a hook of a hoist of a hoist system, the rack in a vertical position being lifted from the ground, according to one embodiment of the invention.

Looking now to FIGS. 11-13, in combination with any of the other figures shown herein, FIG. 11 is a perspective view of a hoist of a hoist system mounted to a top of a structure; FIG. 12 is a loaded rack coupled to a hook of a hoist of a hoist system, the rack in a horizontal position on the ground, according to one embodiment of the invention; and FIG. 13 is loaded rack coupled to a hook of a hoist of a hoist system, the rack in a vertical position being lifted from the ground, according to one embodiment of the invention.

There is shown a hoist system that includes a rack 100 coupled to a first elongated flexible member 170 which is coupled to a hoist 180, and a third elongated flexible member 190 coupled to a bottom of the rack 100. The illustrated hoist is disposed on a roof of a building under construction and the rack includes a load of elongated materials. The hoist is lifting the loaded rack to a floor or roof of the building where the loaded materials may be unloaded and utilized.

The illustrated (in the various figures) rack 100 includes a first floor 110, planar and long in relation to its width, including first end region 112 having a first mount structure, a second end region 114, opposite the first end region 112, a middle region 116 between the first end region 112 and the second end region 114, and a first side 102 of the first floor 110 from which a first plurality of wheels extends, the first plurality of wheels including a first pair of wheels 111 that extend from the first end region 112, a second pair of wheels 113 that extend from the second end region 114, and a third pair of wheels 115 that extend from the middle region 116; and a solid second floor 120 extending orthogonally from the second end region 114 of the first floor 110 opposite the first side 102 of the first floor 110 and including: a second mount structure 122 extending opposite the second end region 114; and a second plurality of wheels 123 extending therefrom opposite the second end region 114 of the first floor 110 and positioned and sized such that when the first floor 110 is tipped, while the first plurality of wheels (111, 113, 115, collectively) is engaged with a surface 200, from horizontal to vertical with the solid second floor 120 being on the bottom, the second plurality of wheels 123 engage with the surface as the first set of wheels disengage with the surface.

The illustrated first elongated flexible member 170 is coupled to the first mount structure 119 by paired hooks and provides a flexible mount structure to which the hoist may attach. The first elongated flexible member may be a rope, cable, or the like and may be of braided metal, plastic, or natural fibers and/or combinations thereof.

The illustrated hoist 180 is coupled to the first elongated flexible member 170 by a second elongated flexible member 182 that may be hooked thereto by a hook 189 and the first elongated flexible member 170 may include a pair of hooks 172, one at each end, which may hook into the first mount 119. The hoist may be mounted to a building at a floor and/or a roof using various coupling structures, such as but not limited to the Hoisting Platform System by Mark Alan Pruskauer of U.S. Pat. No. 9,701,520, which is incorporated by reference herein for its supporting teachings. The illustrated hoist 180 includes a building mount that couples the hoist to a floor 183 or roof 181 of a building. There is also shown an extendible floor 188 coupled to a floor 183 of the building below the hoist 180 and positioned such that when the extendible floor 188 is extended the hoist 180 may directly deposit the rack 100 onto the extended extendible floor 188.

The third elongated flexible member 190 coupled to the second mount structure 122 functions as a tag-line and is held by an operator disposed below the hoist/crane and allows for operator influence of the position, velocity, and/or orientation of the rack while it is suspended and/or in motion.

The illustrated mount points provide structure to which other structures may couple, such as but not limited to securing members (e.g. straps, chains, bungees, ropes, tape) and such may include but are not limited to being d-rings, eyelets welded to the frame, apertures through the frame, bar welded to the frame with spacing/standoffs therefrom, clip mounts, posts, hooks and the like and combinations, thereof.

The illustrated securing members allow workers to secure loads to the cradle such that when the cradle is in operation, the materials remain coupled thereto. Such may include but is not limited to being straps, chains, bungees, wire rope, come-along or ratchet straps, adhesive tape, and combinations thereof.

The illustrated lift cable couples the cradle to a winch or other lift device so that the cradle may be elevated to a desired vertical position. The cable may be and/or include a chain, strap, wire rope, or the like or combinations thereof.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, while the first and second floors are illustrated as being rectangular, in shape the specific shapes and designs of such that satisfy the operational functions described herein are plethoric.

It is expected that there could be numerous variations of the design of this invention. An example is that the illustrated structures may be decorated, painted, and/or otherwise include ornamentation.

Finally, it is envisioned that the components of the device may be constructed of a variety of materials, including but not limited to metals, plastics, ceramics, fibers, composites and the like and combinations thereof.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A construction rack, comprising:
   a. a first floor, planar and long in relation to its width, including:
      i. first end region having a first mount structure,
      ii. a second end region, opposite the first end region,
      iii. a middle region between the first end region and the second end region,
      iv. a first side of the first floor from which a first plurality of wheels extends, the first plurality of wheels including a first pair of wheels that extend from the first end region, a second pair of wheels that extend from the second end region and a third pair of wheels that extend from the middle region;
      v. a pair of flanking protrusions extending from the first end region of the first floor, opposite the first side and opposite each other; and
   b. a solid second floor extending orthogonally from the second end region of the first floor opposite the first side of the first floor and including:
      i. a second mount structure extending opposite the second end region; and
      ii. a second plurality of wheels extending therefrom opposite the second end region of the first floor and positioned and sized such that when the first floor is tipped, while the first plurality of wheels is engaged with a surface, from horizontal to vertical with the solid second floor being on the bottom, the second plurality of wheels engage with the surface as the first set of wheels disengage with the surface.

2. The construction rack of claim 1, further comprising a pair of flanking plates coupled to each of and disposed orthogonal to each of the first floor and the second floor at an intersection of the first floor and the second floor and disposed opposite each other.

3. The construction rack of claim 1, wherein the first mount structure is a pair of aperture plates disposed opposite each other.

4. The construction rack of claim 1, wherein the second mount structure is a bar mounted to the second floor opposite the second end region of the first floor.

5. The construction rack of claim 1, wherein the third pair of wheels are larger in diameter than each of the first pair of wheels and the second pair of wheels.

6. The construction rack of claim 1, further a first strap structure disposed between the first end region and the middle region and a second strap structure disposed between the middle region and the second end region.

7. The construction rack of claim 1, further comprising a plurality of ring mounts disposed along lateral sides of the first floor between the first end region and the second end region of the first floor.

8. The construction rack of claim 1, further comprising an elongated flexible member coupled to the first mount structure.

9. A hoist system, comprising:
a. a rack, including:
  i. a first floor, planar and long in relation to its width, including:
    1. first end region having a first mount structure,
    2. a second end region, opposite the first end region,
    3. a middle region between the first end region and the second end region, and
    4. a first side of the first floor from which a first plurality of wheels extends, the first plurality of wheels including a first pair of wheels that extend from the first end region, a second pair of wheels that extend from the second end region and a third pair of wheels that extend from the middle region; and
  ii. a solid second floor extending orthogonally from the second end region of the first floor opposite the first side of the first floor and including:
    1. a second mount structure extending opposite the second end region; and
    2. a second plurality of wheels extending therefrom opposite the second end region of the first floor and positioned and sized such that when the first floor is tipped, while the first plurality of wheels is engaged with a surface, from horizontal to vertical with the solid second floor being on the bottom, the second plurality of wheels engage with the surface as the first set of wheels disengage with the surface;
b. a first elongated flexible member coupled to the first mount structure;
c. a hoist coupled to the first elongated flexible member by a second elongated flexible member; and
d. a third elongated flexible member coupled to the second mount structure.

10. The hoist system of claim 9, further comprising a pair of flanking protrusions extending from the first end region of the first floor, opposite the first side and opposite each other.

11. The hoist system of claim 10, further comprising a pair of flanking plates coupled to each of and disposed orthogonal to each of the first floor and the second floor at an intersection of the first floor and the second floor and disposed opposite each other.

12. The hoist system of claim 11, wherein the first mount structure is a pair of aperture plates disposed opposite each other.

13. The hoist system of claim 12, wherein the second mount structure is a bar mounted to the second floor opposite the second end region of the first floor.

14. The hoist system of claim 13, wherein the third pair of wheels are larger in diameter than each of the first pair of wheels and the second pair of wheels.

15. The hoist system of claim 14, wherein the hoist includes a building mount that couples the hoist to a floor or roof of a building.

16. The hoist system of claim 15, further comprising an extendible floor coupled to a floor of the building below the hoist and positioned such that when the extendible floor is extended the hoist may directly deposit the rack onto the extendible floor.

17. A rack for containing and transporting elongated objects, comprising: a. an L-shaped floor having:
  i. a planar leg having a first plurality of wheels extending from a backside thereof and a pair of mounting plates disposed on opposite sides thereof, wherein the mounting plates include an array of apertures, and
  ii. a planar foot, the planar foot being smaller than the planar leg, wherein the planar foot is a solid plate and the planar foot includes a second plurality of wheels extending from a bottom thereof and a tag-line mount extending from a bottom thereof.

18. The rack of claim 17, further comprising a
pair of flanking posts extending forwardly from a top region of the leg and
a pair of flanking plates disposed at a bottom region of the leg and
extending from each of the leg and the foot.

* * * * *